United States Patent
Chahal et al.

(10) Patent No.: US 10,864,980 B2
(45) Date of Patent: Dec. 15, 2020

(54) SYSTEM AND METHOD FOR FEATHERING AN AIRCRAFT PROPELLER

(71) Applicant: PRATT & WHITNEY CANADA CORP., Longueuil (CA)

(72) Inventors: Jasraj Chahal, Lasalle (CA); Carmine Lisio, Laval (CA); Darragh McGrath, Montreal (CA); Giancarlo Zingaro, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 204 days.

(21) Appl. No.: 16/031,361

(22) Filed: Jul. 10, 2018

(65) Prior Publication Data
US 2020/0017196 A1  Jan. 16, 2020

(51) Int. Cl.
*B64C 11/42* (2006.01)
*B64C 11/38* (2006.01)

(52) U.S. Cl.
CPC ............ *B64C 11/385* (2013.01); *B64C 11/42* (2013.01)

(58) Field of Classification Search
CPC ............................. B64C 11/385; B64C 11/42
See application file for complete search history.

(56) References Cited

U.S. PATENT DOCUMENTS

| | | | |
|---|---|---|---|
| 2,360,791 A | 10/1944 | Putnam et al. | |
| 2,699,220 A * | 1/1955 | Mergen | B64C 11/42 416/46 |
| 3,589,830 A * | 6/1971 | Mogren | B63H 3/10 416/1 |
| 3,679,033 A * | 7/1972 | Wagner | F16D 25/14 192/48.7 |
| 4,588,354 A * | 5/1986 | Duchesneau | B64C 11/38 416/27 |
| 5,019,006 A | 5/1991 | Schneider et al. | |
| 5,174,718 A * | 12/1992 | Lampeter | B64C 11/38 416/157 R |
| 5,209,640 A * | 5/1993 | Moriya | B64C 11/40 416/27 |
| 5,213,471 A * | 5/1993 | Miller | B64C 11/325 416/129 |

(Continued)

FOREIGN PATENT DOCUMENTS

GB                818293 A        8/1959

*Primary Examiner* — Aaron R Eastman
*Assistant Examiner* — Theodore C Ribadeneyra
(74) *Attorney, Agent, or Firm* — Norton Rose Fulbright Canada LLP

(57) ABSTRACT

A system and method for feathering an aircraft propeller are provided. The aircraft propeller is coupled to an actuator for setting a blade pitch of the propeller. The blade pitch is controlled by modulating a supply of hydraulic fluid to the actuator. At least one feather solenoid is provided that comprises a first solenoid coil, a second solenoid coil, and a solenoid valve coupled to the actuator and to the first and the second solenoid coil. At least one controller is configured to selectively energize and de-energize the first and the second solenoid coil. The solenoid valve is configured to be activated when the first solenoid coil and the second solenoid coil are de-energized and to, when activated, modulate the supply of hydraulic fluid to the actuator for adjusting the blade pitch of the propeller towards a feather position.

18 Claims, 7 Drawing Sheets

(56) References Cited

U.S. PATENT DOCUMENTS

| | | | |
|---|---|---|---|
| 5,284,418 A * | 2/1994 | Moriya | B64C 11/44 |
| | | | 416/35 |
| 5,299,911 A * | 4/1994 | Moriya | B64C 11/44 |
| | | | 416/35 |
| 5,562,417 A | 10/1996 | Grimm et al. | |
| 5,897,293 A | 4/1999 | Arel et al. | |
| 5,997,250 A | 12/1999 | Carter, Jr. et al. | |
| 6,422,816 B1 | 7/2002 | Danielson | |
| 6,685,138 B1 * | 2/2004 | Krantz | B64C 13/42 |
| | | | 244/99.5 |
| 6,811,376 B2 * | 11/2004 | Arel | B64C 11/38 |
| | | | 416/155 |
| 8,162,086 B2 * | 4/2012 | Robinson | B60K 11/04 |
| | | | 123/41.49 |
| 9,120,559 B2 * | 9/2015 | Danielson | B64C 11/38 |
| 2004/0033136 A1 * | 2/2004 | Bettencourt | F04D 29/362 |
| | | | 416/1 |
| 2011/0023836 A1 * | 2/2011 | Verner | F02D 41/20 |
| | | | 123/490 |
| 2013/0251499 A1 * | 9/2013 | Rampen | F15B 20/007 |
| | | | 415/1 |
| 2013/0307493 A1 * | 11/2013 | Ichinose | F03D 9/255 |
| | | | 322/40 |
| 2014/0242859 A1 * | 8/2014 | Ochiai | B63H 20/28 |
| | | | 440/88 M |

* cited by examiner

US 10,864,980 B2

SYSTEM AND METHOD FOR FEATHERING AN AIRCRAFT PROPELLER

TECHNICAL FIELD

The application relates generally to propeller control systems for aircraft engines and, more particularly, to a system and method for feathering an aircraft propeller.

BACKGROUND

Actuation of propeller blade pitch to the feather position is typically done through a bypass circuit of a pitch control unit, in order to quickly actuate the propeller blades to change the blade pitch to the feather position. Typically, the bypass circuit is controlled by an electro-hydraulic actuator referred to as a feather solenoid.

The feather solenoid as a sub-component of the pitch change actuator of the pitch control unit conventionally has a single coil that is electrically driven to cause the blade pitch to change to the feather position. In particular, when the feather solenoid is electrically driven, oil used to control the pitch change actuator is redirected to drive the propeller blades in the pitch direction towards the feather position.

However, as existing propeller control systems use electrical power to feather the propeller, the propeller control system would not be able to feather the propeller in the event of loss of electrical power.

There is thus a need for improved systems and methods for feathering an aircraft propeller.

SUMMARY

In accordance with an aspect, a system for feathering an aircraft propeller is provided. The aircraft propeller has coupled thereto an actuator for setting a blade pitch of the propeller. The blade pitch is controlled by modulating a supply of hydraulic fluid to the actuator. The system comprises: at least one feather solenoid comprising a first solenoid coil, a second solenoid coil, and a solenoid valve coupled to the actuator and to the first and the second solenoid coil; and at least one controller configured to selectively energize and de-energize the first and the second solenoid coil, where the solenoid valve is configured to be activated when the first solenoid coil and the second solenoid coil are de-energized and to, when activated, modulate the supply of hydraulic fluid to the actuator for adjusting the blade pitch of the propeller towards a feather position.

In accordance with an aspect, a method for feathering an aircraft propeller. The aircraft propeller has coupled thereto an actuator for setting a blade pitch of the propeller. The blade pitch is controlled by modulating a supply of hydraulic fluid to the actuator. The method comprises: receiving a command to feather the propeller; in response to receiving the command, commanding at least one controller to de-energize a first feather solenoid coil and a second feather solenoid coil, the first and second solenoid coil coupled to a solenoid valve coupled to the actuator; and activating the solenoid valve when the first solenoid coil and the second solenoid coil are de-energized, the solenoid valve, when activated, modulating the supply of hydraulic fluid to the actuator for adjusting the blade pitch of the propeller towards a feather position.

BRIEF DESCRIPTION OF DRAWINGS

Reference is now made to the accompanying figures in which.

DETAILED DESCRIPTION

Figure 1:
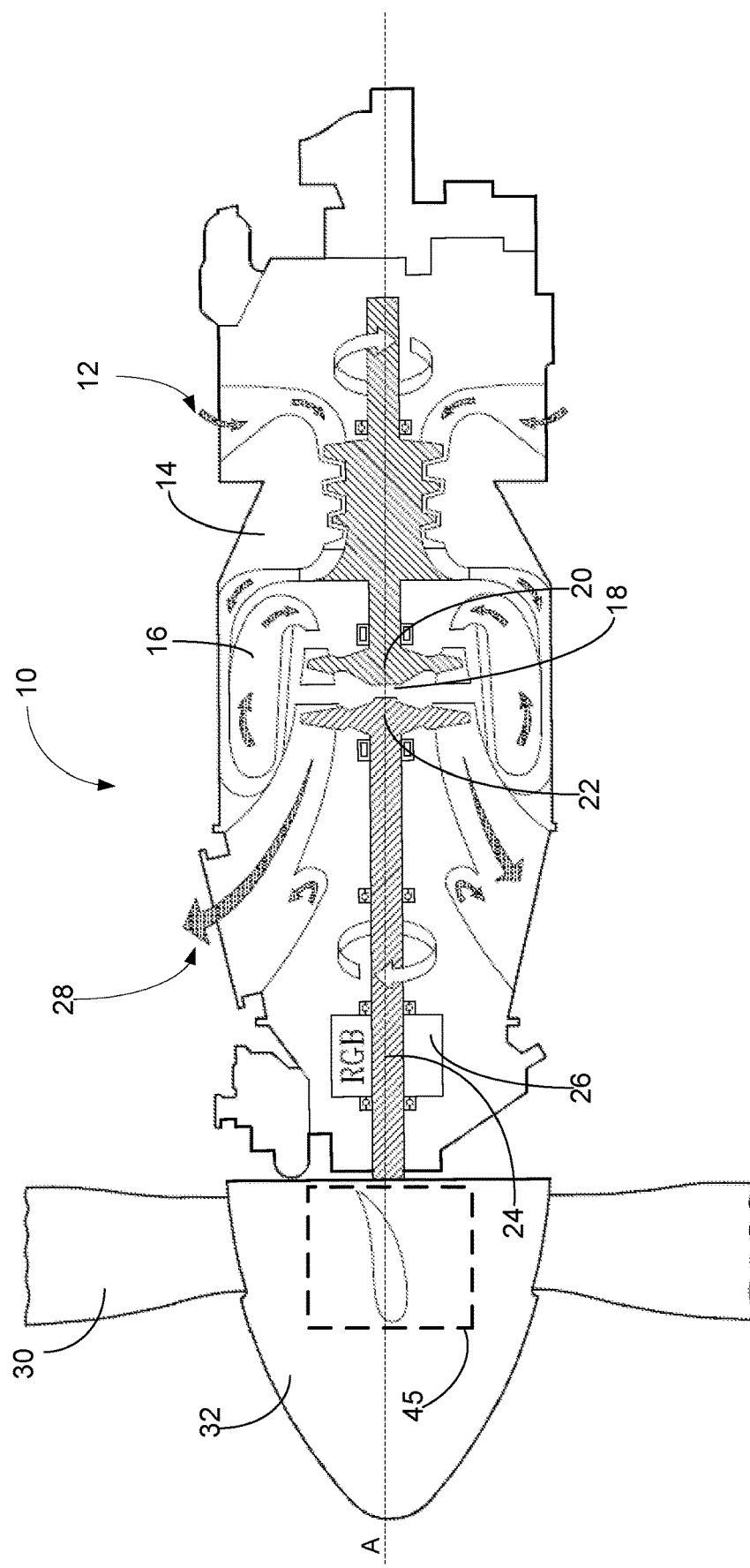
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a longitudinal propeller shaft axis A through a reduction gear box 26. Hot gases may then be evacuated through exhaust stubs 28. The gas generator of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades connected to a hub any suitable means and extending radially therefrom. The blades are also each rotatable about their own radial axes through a plurality of blade angles, which can be changed to achieve modes of operation, such as feather, full reverse, and forward thrust. The blade angle (also referred to herein as the "blade pitch") of the propeller 30 may be controlled by a pitch control unit (PCU) 45.

Figure 2:
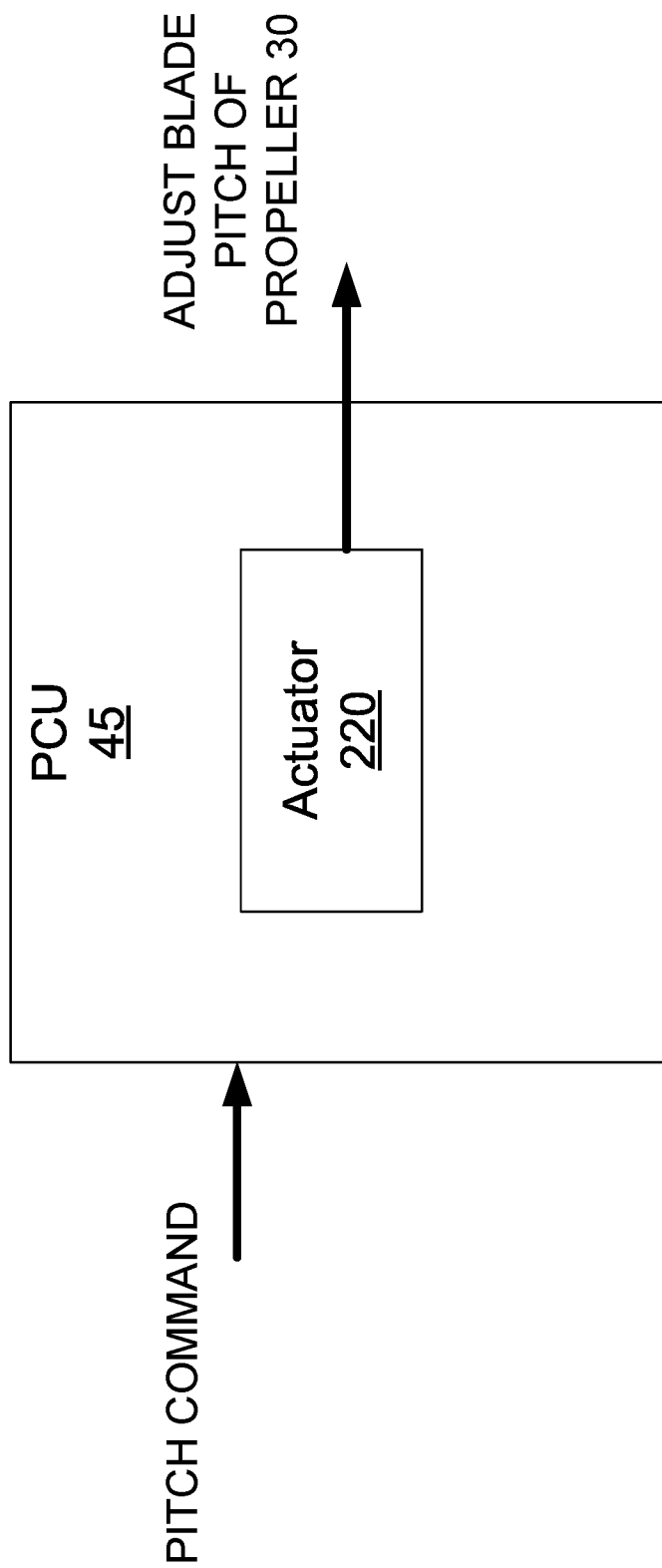
FIG. 2 is a block diagram of an example of a pitch control unit, in accordance with an illustrative embodiment.

With additional reference to FIG. 2, in accordance with one embodiment, the PCU 45 comprises a hydraulic circuit driven by hydraulic fluid (e.g., oil) provided to the hydraulic circuit by one or more pumps of the engine 10. The hydraulic circuit comprises a pitch change actuator 220 and the blade pitch may be controlled by modulating hydraulic fluid pressure (e.g., oil pressure) in the pitch change actuator 220, which causes a rotational twist of the blades. That is, the blade pitch of the propeller 30 is variable and may be modified by the pitch change actuator 220. An electronic controller (not illustrated in FIG. 2) may command the PCU 45 to change the blade pitch. The electronic controller may receive commands to change the blade pitch from an aircraft lever or an aircraft computer. For example, the electronic controller may receive commands to control the blade pitch into a feather position. Alternatively, a mechanical or hydro-mechanical control mechanisms (not illustrated) connected to control levers in the cockpit of the aircraft may be used to command the PCU 45 to change the blade pitch. The pitch change actuator 220 may take different forms, depending on the type of engine and/or aircraft. The pitch change actuator may be a hydraulic actuator or an electro-hydraulic actuator. In some embodiments, there may be gearing, such as that found on turboprop aircraft. The implementation of PCU 45 may vary depending on practical implementations.

Figure 3:
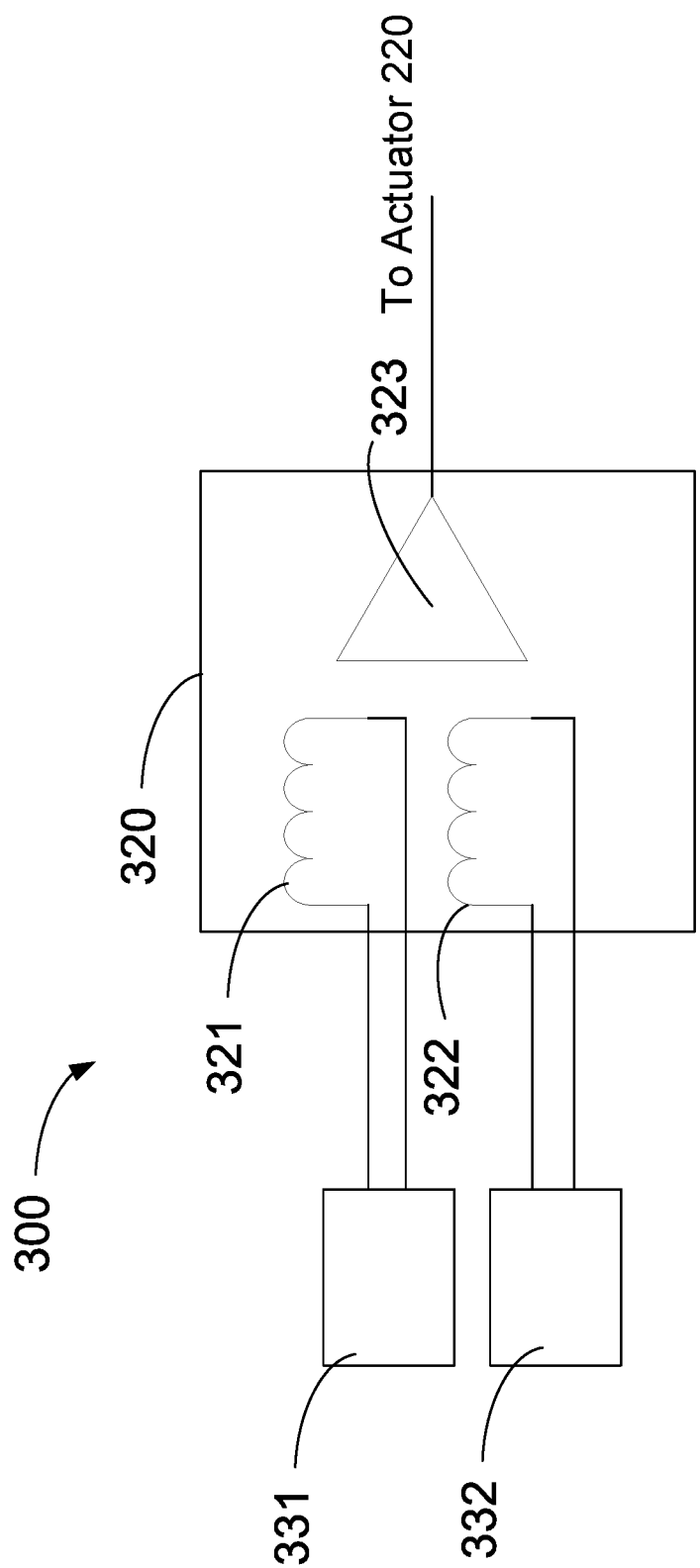
FIG. 3 is a schematic diagram of a system for feathering an aircraft propeller, in accordance with an illustrative embodiment.

FIG. 3 illustrates a system 300 for feathering a propeller of an engine, such as the engine 10 of FIG. 1. The system 300 comprises an electro-hydraulic actuator 320 for feathering the blade pitch of the propeller 30. It should be understood that, although a single electro-hydraulic actuator 320 is illustrated in FIG. 3 and described herein, the control system 300 may comprise more than one electro-hydraulic actuator. The electro-hydraulic actuator 320 is referred to herein as a "feather solenoid" or a "solenoid". In the illustrated embodiment, the feather solenoid is a dual coil feather solenoid. Alternatively, two single coil feather solenoids may be used. The feather solenoid 320 is configured for modifying the blade pitch of the propeller 30 to drive the propeller 30 towards the feather position. In accordance with an embodiment, the feather solenoid 320 is provided as part of the PCU 45. In accordance with an embodiment, the feather solenoid 320 is provided separate from the pitch change actuator 220. The pitch change actuator 220 is a device that allows for fine adjustment of propeller blade angle over the full range of the propeller blade pitch. While the pitch change actuator 220 may be used to drive the propeller to feather, the time it would take would be typically greater than with the feather solenoid 320. In one embodiment, using the feather solenoid 320, which conducts the feather function, ensures that propeller control via the pitch change actuator 220 and propeller protection functions via the feather solenoid 320 are separate controls and outputs. It should be appreciated that, in some embodiments, this ensures that no single electrical failure will lead to the inability of the propeller 30 to feather. While the feathering solenoid 320 is for feathering the propeller 30 and is illustrated as an independent actuator from the pitch change actuator 220, it should be understood that a common actuator for propeller feathering and pitch change may be used.

Reference to "feathering" the propeller 30 or adjusting the blade pitch to "feather" the propeller refers to directing the blades of the propeller 30 to the feather position. Reference to "unfeather" or "unfeathering" of the propeller 30 refers to directing the blades of the propeller 30 to a position other than the feather position. In the feather position, the blade pitch is positioned where a maximum rotational drag and a minimum forward motion exists. Controlling the propeller blade pitch to the feather position may be performed, for example, on the ground following an engine start, preceding a shutdown of the engine on ground or in flight, and/or on a failed engine during the take-off phase.

As illustrated, the feather solenoid 320 comprises a first solenoid coil 321, a second solenoid coil 322 and a solenoid valve 323. A first solenoid driver 331 is configured to energize (or power) the first solenoid coil 321 by supplying current to the first solenoid coil 321 from a first power source (not shown in FIG. 3) and to de-energize (or de-power) the first solenoid coil 321 by not supplying current to the first solenoid coil 321. Similarly, a second solenoid driver 332 is configured to energize the second solenoid coil 322 by supplying current to the second solenoid coil 322 from a second power source (not shown in FIG. 3) and to de-energize the second solenoid coil 322 by not supplying current to the second solenoid coil 322. The feather solenoid 320 is configured to actuate the propeller blades to change the blade pitch to the feather position when both the first solenoid coil 321 and the second solenoid coil 322 are de-energized. For example, the feather solenoid 320 is configured to control a bypass circuit of the pitch control unit 45 to drive the propeller 30 to the feather position. In accordance with an embodiment, when first solenoid coil 321 and the second solenoid coil 322 are de-energized, hydraulic fluid from a fine pitch hydraulic circuit is redirected to drain, and when this occurs, a protection valve of the pitch change actuator 220 translates such that the flow rate of hydraulic fluid to a coarse pitch hydraulic circuit is increased. Accordingly, this typically increases the rate at which the propeller blades change their blade pitch to the feather position. In other words, the solenoid valve 323 is configured to control hydraulic fluid in the pitch change actuator 220 in order to adjust the blade pitch of the propeller 30 to feather. The solenoid valve 323 is configured to be activated when both the first solenoid coil 321 and the second solenoid coil 322 are de-energized. When the solenoid valve 323 is activated, the solenoid valve 323 causes a supply of hydraulic fluid to the propeller 30 to be modified for adjusting the blade pitch of the propeller 30 towards the feather position. In particular, when the solenoid valve 323 is activated, the solenoid valve 323 is configured to control the supply of hydraulic fluid in the pitch change actuator 220 to drive the propeller to feather. Controlling the supply of hydraulic fluid in the pitch change actuator 220 to drive the propeller to feather may comprise redirecting the hydraulic fluid in the pitch change actuator 220, modulating pressure of the hydraulic fluid and/or any other suitable adjustment to the hydraulic fluid in the pitch change actuator 220.

In one embodiment, by requiring both of the solenoid coils 321, 322 to be de-energized to feather the propeller 30, it should be appreciated that if one of the power sources fails (i.e., is non-functional) or if one of the solenoid drivers 331, 332 fails, the functional one of the power sources or solenoid drivers may still be used to command the propeller 30 to feather or unfeather.

Figure 4:
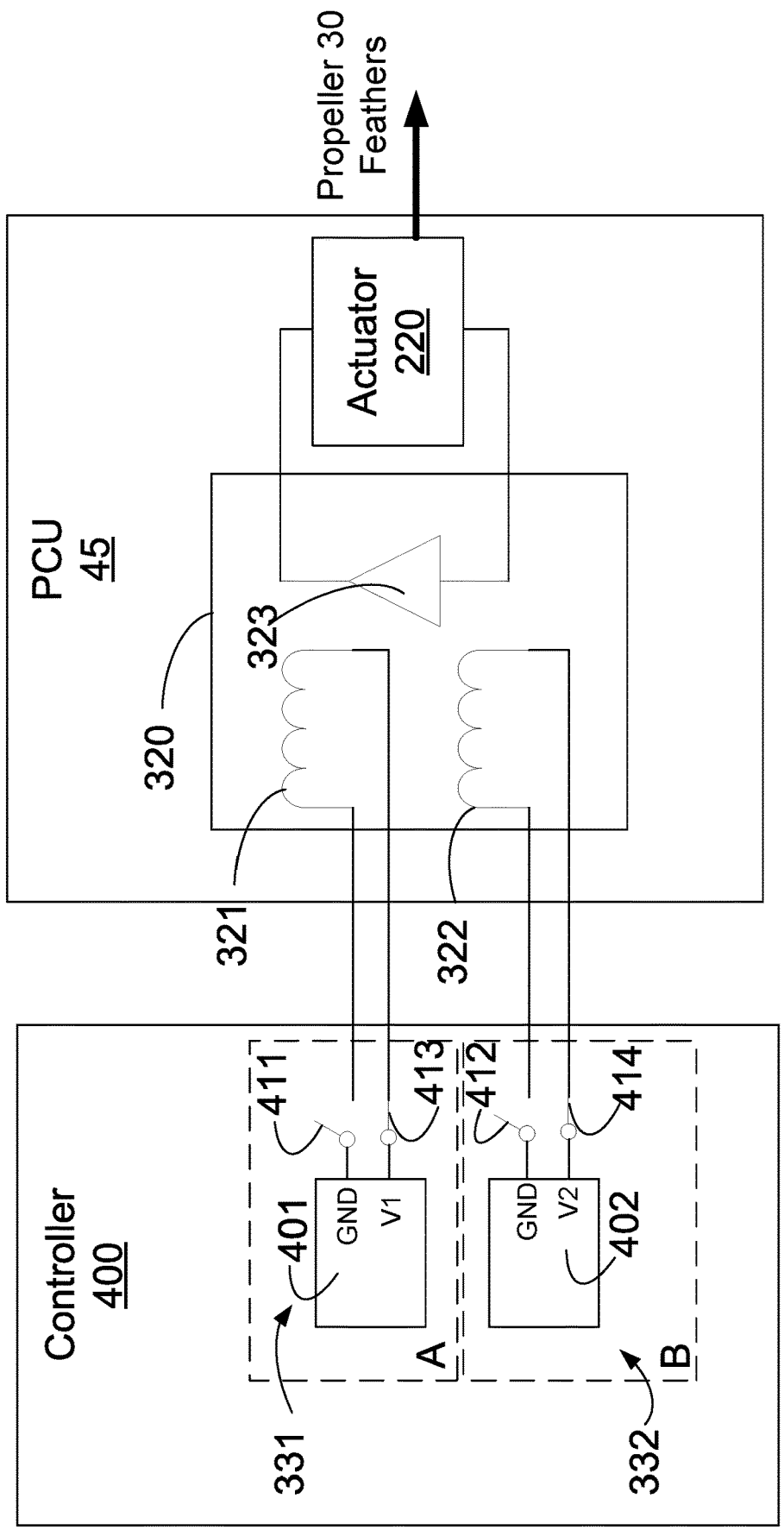
FIG. 4 is a schematic diagram of the system of FIG. 3, illustrating an example where the propeller is directed to feather.
Figure 5:
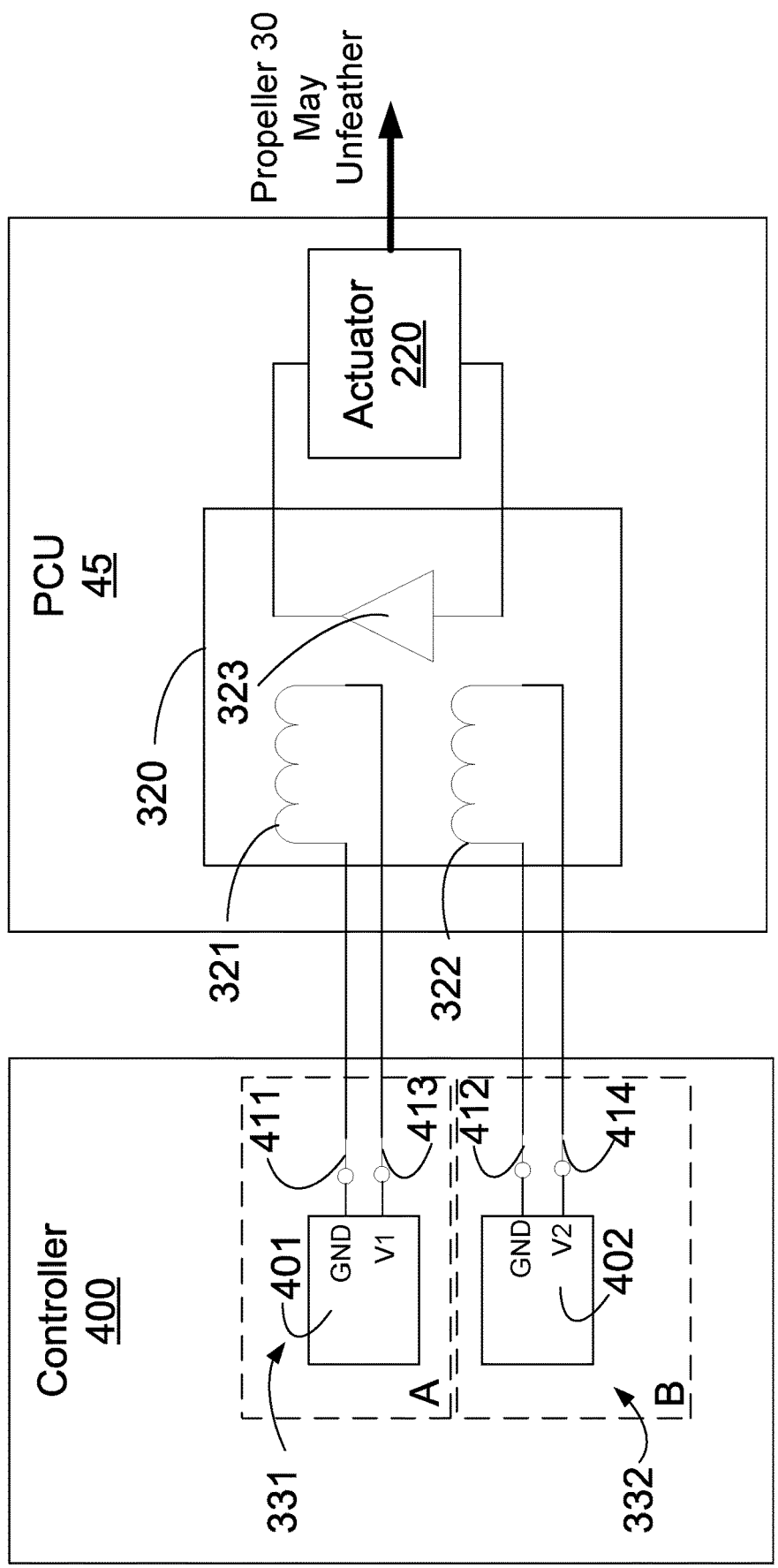
FIG. 5 is a schematic diagram of the system of FIG. 3, illustrating an example where the propeller may unfeather.

Referring to FIGS. 4 and 5, in accordance with an embodiment, the first solenoid driver 331 is configured to energize the first solenoid coil 321 by connecting (e.g., as shown in FIG. 5) the first solenoid coil 321 to a first power source 401 and to de-energize the first solenoid coil 321 by disconnecting (e.g., as shown in FIG. 4) the first solenoid coil 321 from the first power source 401. Similarly, in accordance with an embodiment, the second solenoid driver 332 is configured to energize the second solenoid coil 322 by connecting (e.g., as shown in FIG. 5) the second solenoid coil 322 to a second power source 402 and to de-energize the second solenoid coil 322 by disconnecting (e.g., as shown in FIG. 4) the second solenoid coil 322 from the second power source 402. The first power source 401 and the second power source 402 are independent electrical power sources. When the first solenoid driver 331 is non-functioning (e.g., has lost power from the first power source 401 or has failed), the first solenoid coil 321 is de-energized. Similarly, when the second solenoid driver 332 is non-functioning (e.g., has lost power from the second power source 402 or has failed), the second solenoid coil 322 is de-energized.

As illustrated, the first solenoid coil 321 has two ends where one of the ends is for being connected to a first voltage V1 of the first power source 401 and the other end is for being connected to ground GND. Similarly, the second solenoid coil 322 has two ends where one of the ends is for being connected to a second voltage V2 of the second power source 402 and the other end is for being connected to ground GND.

In accordance with an embodiment, each of the solenoid drivers 331, 332 comprises a first electrical switch 411, 412 controllable between an open position (e.g., as shown in FIG. 4) and a closed position (e.g., as shown in FIG. 5). When in the closed position, each of the first electrical switches 411, 412 is configured to connect a corresponding one of the solenoid coils 321, 322 to ground GND in order to energize the corresponding solenoid coil 321, 322. When in the open position, each of the first electrical switches 411, 412 is configured to disconnect the corresponding solenoid 321, 322 coil from ground GND in order to de-energize the corresponding solenoid coil 321, 322. In this example embodiment, the first solenoid coil 321 is connected to the first voltage V1 and the first electrical switch 411 of the first solenoid driver 331 is used to connect/disconnect the first solenoid coil 321 to/from the first power source 401. Similarly, in this example embodiment, the second solenoid coil 322 is connected to the second voltage V2 and the first electrical switch 412 of the second solenoid driver 332 is used to connect/disconnect the second solenoid coil 322 to/from the second power source 402.

The first switches 411, 412 may be controlled by the electronic controller 400 and in the illustrated embodiment the electronic controller 400 comprises the switches 411, 412. Alternatively, the switches 411, 412 may be separate from the electronic controller 400. Each of the first switches 411, 412 may be referred to as a low side switch (LSS), as they are used to connect/disconnect the solenoid coils 321, 322 to/from ground GND. In accordance with an embodiment, the first switches 411, 412 are configured to default to the open position when the electronic controller 400 is unpowered, thereby driving the propeller 30 to feather.

In some embodiments, each of the solenoid drivers 331, 332 comprises a second electrical switch 413, 414 controllable between an open position and a closed position. When in the closed position, each one of the second electrical switches 413, 414 is configured to connect a corresponding solenoid coil 321, 322 to a corresponding voltage V1, V2 provided by a corresponding power source 401, 402. When in the open position, each one of the second electrical switches is configured to disconnect the corresponding solenoid coil from the corresponding voltage V1, V2. The second switches 413, 414 may be controlled by the electronic controller 400 and in the illustrated embodiment the electronic controller 400 comprises the second switches 413, 414. Alternatively, the second switches 413, 414 may be separate from the electronic controller 400. Each of the second switches 413, 414 may be referred to as a high side switch (HSS), as they are used to connect/disconnect the solenoid coils 321, 322 to/from the voltage V1, V2 of the power sources 401, 402. In some embodiments, the second switches 413, 414 may be omitted or may be configured to always remain closed. In some embodiments, the second switches 413, 414 are configured to default to the closed position (even when the electronic controller 400 is unpowered). Alternatively, the second switches 413, 414 may be configured to default to the open position and the first switch 411, 412 may be configured to default to the closed position. Accordingly, in some embodiments, the second switches 413, 414 are configured to default to the open position when the electronic controller 400 is unpowered, thereby driving the propeller 30 to feather. In other embodiments, the first switch (e.g., first switch 411) and second switch (e.g., second switch 413) of a given solenoid driver (e.g., the first solenoid driver 331) are both controlled by the controller 400 such that the pair of switches (e.g., first switch 411 and the second switch 413) is either in the open or closed position. Accordingly, the switches 411, 412, 413, 414 may all be configured to default to the open position when the electronic controller 400 is unpowered, thereby driving the propeller 30 to feather.

In accordance with an embodiment, the electronic controller 400 comprises a first channel A for controlling the first solenoid driver 331 and a second channel B for controlling the second solenoid driver 332. The first channel A is powered by the first power source 401 and the second channel B is powered by the second power source 402. In accordance with an embodiment, the controller 400 is connected to two independent power sources in order to provide the power sources 401, 402. Accordingly, while the power sources 401, 402 are illustrated as part of the controller 400, the power sources 401, 402 may be external of the controller 400. In some embodiments, the electronic controller 400 is a full-authority digital engine control (FADEC). The electronic controller 400 may be referred to as a dual channel electronic controller or a dual channel FADEC. In accordance with an embodiment, the channels A, B are separate redundant channels that provide duplicate functionality. Alternatively, the first solenoid driver 331 and the second solenoid driver 332 may be provided as separate electronic controllers (implemented similarly to the electronic controller 400).

Each channel A or B may control its respective switch 411, 412. This may be referred to as dependent ACTIVE/ACTIVE system. The control by either channel A or B of its respective switch 411, 412, may be irrespective of a channel-in-control (CIC) of the electronic controller 400. In the case of a single channel dispatch, such as when one of the channels (e.g., channel B) is non-functioning (e.g., failed or unpowered), only one of the solenoid coils (e.g., the first solenoid coil 321) of the feather solenoid 320 would need to be commanded to de-energize to feather the propeller 30. This is because the first switch (e.g., the first switch 412 of the first solenoid driver 332) of the non-functioning channel (e.g., channel B) is configured to default to the open position when the channel is non-functioning. Since both solenoid coils 321, 322 of the feather solenoid 320 need to be de-energized to feather the propeller 30, the propeller 30 is able to unfeather if the low side switch (e.g., the first switch 411) of the functional channel (e.g., channel A) is in the closed position.

In some embodiments, the first electrical switch 411 of the first solenoid driver 331 is configured to default to the open position when the first channel A is unpowered and the first electrical switch 412 of the second solenoid driver 332 is configured to default to the open position when the second channel B is unpowered. Similarly, in some embodiments, the second electrical switch 413 of the first solenoid driver 331 is configured to default to the open position when the first channel A is unpowered and the second electrical switch 414 of the second solenoid driver 332 is configured to default to the open position when the second channel B is unpowered. In some embodiments, the first electrical switch 411 and the second electrical switch 413 of the first solenoid driver 331 are configured to default to the open position when the first channel A is unpowered and the first electrical switch 412 and the second electrical switch 414 of the second solenoid driver 332 is configured to default to the open position when the second channel B is unpowered.

It should be appreciated that in the case of electrical power loss, the pitch change actuator 220 in the PCU 45 can be configured to drive the propeller 30 towards coarse pitch and eventually to a full feathered state. However, in this case, both first and second switches 411, 412 will be in the open position, and the propeller 30 will be driven to feather. Moreover, in the event of a fire, the provided configuration of the control system 300 may result in a more desirable transition to the feathered position.

Figure 6:
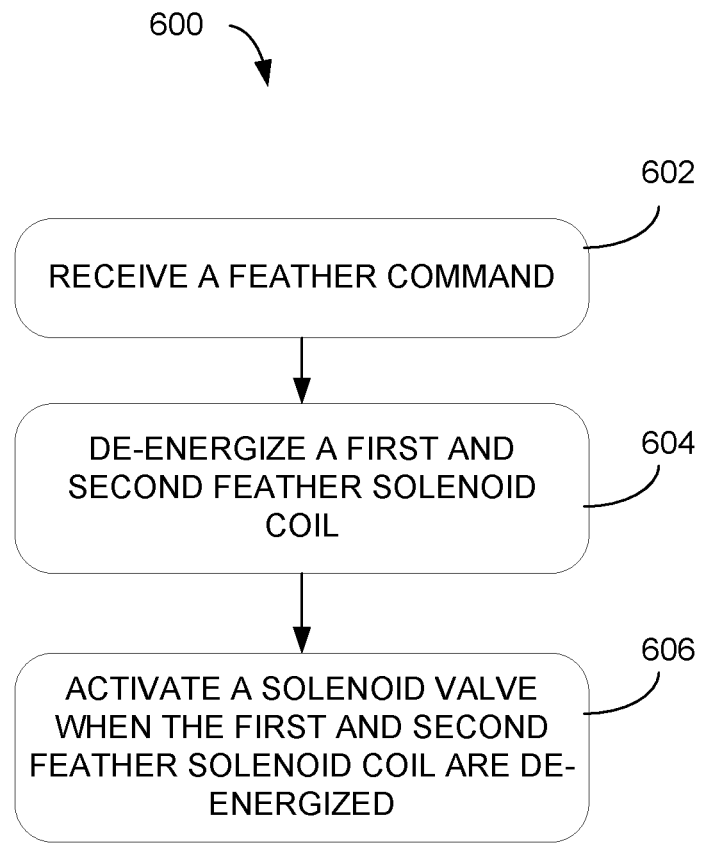
FIG. 6 is a flowchart of a method for feathering an aircraft propeller, in accordance with an embodiment.

With reference to FIG. 6, there is shown a flowchart illustrating an example method 600 for feathering an aircraft propeller. While method 600 is described herein with reference to engine 10, this is for example purposes. The method 600 may be applied to any suitable engine. At step 602, a feather command to drive the propeller to the feather position is received to feather the propeller 30. The feather command may be received at the controller 400 from an aircraft computer. For example, the controller 400 may receive a feather command from a condition lever input in a cockpit pedestal or an emergency feather command by flight crew (e.g., via a fire handle). By way of another example, the feather command may be from an automated feathering function commanded through an aircraft or power plant system without flight crew initiation (e.g., from an automated propeller drag limiting system). At step 604, in response to receiving the feather command, the controller 400 is commanded to de-energize the first feather solenoid coil 321 and the second feather solenoid coil 322. In some embodiments, commanding the controller 400 to de-energize the first solenoid coil 321 and the second solenoid coil 322 comprises commanding the first solenoid driver 331 to de-energize the first solenoid coil 321 and commanding the second solenoid driver 332 to de-energize the second solenoid coil 322. In some embodiments, commanding the first solenoid driver 331 to de-energize the first solenoid coil 321 comprises commanding the channel A to control the first solenoid driver 331 and commanding the second solenoid driver 332 to de-energize the second solenoid coil 322 comprises commanding the second channel B to control the second solenoid driver 332. The commanding to de-energize the first solenoid coil 321 and the second solenoid coil 322 may be performed as described elsewhere in this document. For example, commanding the first solenoid driver 331 to de-energize the first solenoid coil 321 may comprise commanding the first electrical switch 411 of the first solenoid driver 331 to the open position for removing the first supply of current to the first solenoid coil 321; and commanding the second solenoid driver 332 to de-energize the second solenoid coil 322 may comprise commanding the first electrical switch 412 of the second solenoid driver 332 to the open position for removing the second supply of current to the second solenoid coil 322. Furthermore, commanding the first electrical switch 411 of the first solenoid driver 331 to the open position may comprise disconnecting the first solenoid coil 321 from ground and commanding the first electrical switch 412 of the second solenoid driver 332 to the open position may comprise disconnecting the second solenoid coil 322 from ground. At step 606, when the first solenoid coil 321 and the second solenoid coil 322 are de-energized, the solenoid valve 323 is activated. The solenoid valve 323, when activated, modulates the supply of hydraulic fluid to the actuator 220 for adjusting the blade pitch of the propeller 30 towards the feather position.

Figure 7:
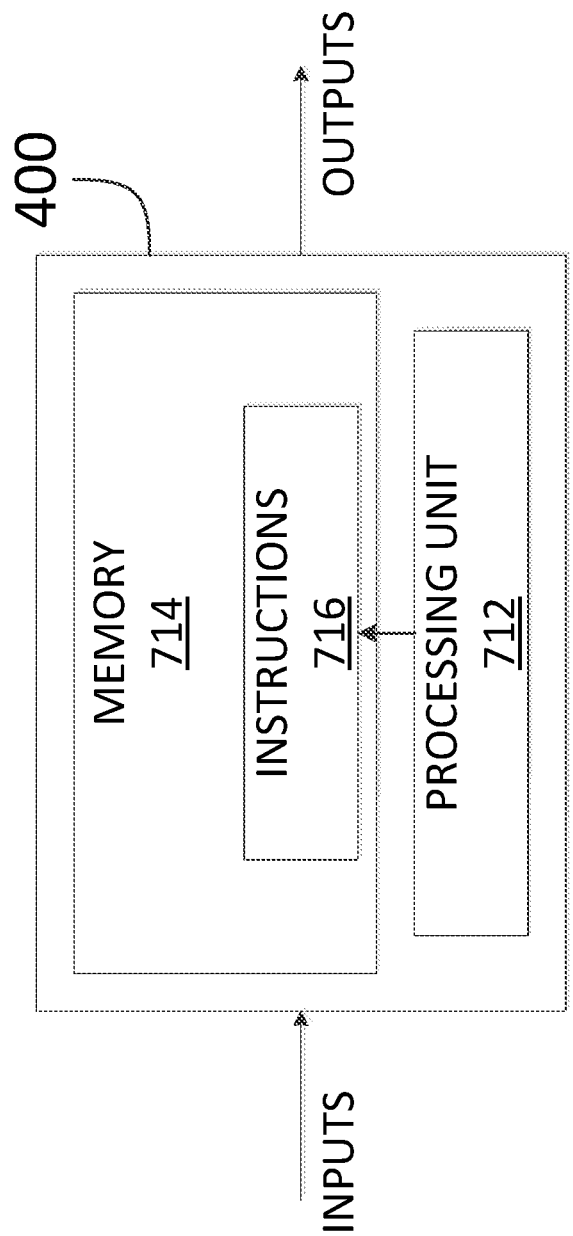
FIG. 7 is a block diagram of an example computing system for implementing the method of FIG. 6 in accordance with an embodiment.

With reference to FIG. 7, the method 600 may be implemented at least in part using the computing device 400 (also referred to herein as the electronic controller) comprising a processing unit 712 and a memory 714 which has stored therein computer-executable instructions 716. The processing unit 712 may comprise any suitable devices configured to implement the system such that instructions 716, when executed by the computing device 400 or other programmable apparatus, may cause the functions/acts/steps of the method 600 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 400 can be implemented as part of a full-authority digital engine controls (FADEC) or other similar device, including electronic engine control (EEC), engine control unit (ECU), and the like.

The methods and systems for feathering an aircraft propeller described herein may be implemented in a high level procedural or object oriented programming or scripting language, or a combination thereof, to communicate with or assist in the operation of a computer system, for example the computing device 400. Alternatively, the methods and systems for feathering an aircraft propeller may be implemented in assembly or machine language. The language may be a compiled or interpreted language. Program code for implementing the methods and systems for feathering an aircraft propeller may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for feathering an aircraft propeller may also be considered to be implemented by way of a non-transitory computer-readable storage medium having a computer program stored thereon. The computer program may comprise computer-readable instructions which cause a computer, or in some embodiments the processing unit 712 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for feathering an aircraft propeller may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A system for feathering an aircraft propeller having coupled thereto an actuator for setting a blade pitch of the propeller, the blade pitch controlled by modulating a supply of hydraulic fluid to the actuator, the system comprising:
    at least one feather solenoid comprising a first solenoid coil, a second solenoid coil, and a solenoid valve coupled to the actuator and to the first and the second solenoid coil; and
    at least one controller configured to selectively energize and de-energize the first and the second solenoid coil, the solenoid valve configured to be activated when the first solenoid coil and the second solenoid coil are de-energized and to, when activated, modulate the supply of hydraulic fluid to the actuator for adjusting the blade pitch of the propeller towards a feather position.

2. The system of claim 1, wherein the at least one controller comprises a first solenoid driver configured to selectively energize and de-energize the first solenoid coil and a second solenoid driver configured to selectively energize and de-energize the second solenoid coil, the at least one controller comprising a first channel for controlling the first solenoid driver and a second channel for controlling the second solenoid driver.

3. The system of claim 2, wherein the first solenoid driver and the second solenoid driver are configured to respectively de-energize the first solenoid coil and the second solenoid coil in response to receiving a feather command.

4. The system of claim 2, wherein each of the first solenoid driver and the second solenoid driver comprises a first electrical switch connected to a corresponding one of the first solenoid coil and the second solenoid coil, the first electrical switch controllable between an open position and a closed position and configured to, when in the closed position, connect the corresponding solenoid coil to ground and to, when in the open position, disconnect the corresponding solenoid coil from ground.

5. The system of claim 4, wherein the first electrical switch of the first solenoid driver is configured to default to the open position when the first channel is unpowered and the first electrical switch of the second solenoid driver is configured to default to the open position when the second channel is unpowered.

6. The system of claim 4, wherein the first electrical switch of the first solenoid driver is configured to default to the open position when the first channel is non-functioning and the first electrical switch of the second solenoid driver is configured to default to the open position when the second channel is non-functioning.

7. The system of claim 4, wherein each of the first solenoid driver and the second solenoid driver comprises a second electrical switch connected to a corresponding one of the first solenoid coil and the second solenoid coil, the second electrical switch controllable between the open position and the closed position and configured to, when in the closed position, connect the corresponding solenoid coil to a power source and to, when in the open position, disconnect the corresponding solenoid coil from the power source.

8. The system of claim 7, wherein the corresponding solenoid coil is de-energized when at least one of the first electrical switch and the second electrical switch is in the open position.

9. The system of claim 7, wherein the second electrical switch of the first solenoid driver is configured to default to the open position when the first channel is unpowered and the second electrical switch of the second solenoid driver is configured to default to the open position when the second channel is unpowered.

10. The system of claim 7, wherein the first electrical switch and the second electrical switch of the first solenoid driver are configured to default to the open position when the first channel is unpowered and the first electrical switch and the second electrical switch of the second solenoid driver is configured to default to the open position when the second channel is unpowered.

11. The system of claim 2, wherein the at least one controller is a full authority digital engine control (FADEC) and the first channel and the second channel are redundant channels.

12. A method for feathering an aircraft propeller having coupled thereto an actuator for setting a blade pitch of the propeller, the blade pitch controlled by modulating a supply of hydraulic fluid to the actuator, the method comprising:
    receiving a command to feather the propeller;
    in response to receiving the command, commanding at least one controller to de-energize a first feather solenoid coil and a second feather solenoid coil, the first and second solenoid coil coupled to a solenoid valve coupled to the actuator; and
    activating the solenoid valve when the first solenoid coil and the second solenoid coil are de-energized, the solenoid valve, when activated, modulating the supply of hydraulic fluid to the actuator for adjusting the blade pitch of the propeller towards a feather position.

13. The method of claim 12, wherein commanding the at least one controller to de-energize the first solenoid coil and the second solenoid coil comprises commanding a first solenoid driver to de-energize the first solenoid coil and commanding a second solenoid driver to de-energize the second solenoid coil.

14. The method of claim 13, wherein commanding the first solenoid driver to de-energize the first solenoid coil comprises commanding a first electrical switch of the first solenoid driver to an open position for disconnecting the first solenoid coil from ground; and wherein commanding the second solenoid driver to de-energize the second solenoid coil comprises commanding a first electrical switch of the second solenoid driver to an open position for disconnecting the second solenoid coil from ground.

15. The method of claim 14 wherein the first electrical switch of the first solenoid driver is configured to default to the open position when a first channel of the at least one controller is unpowered and the first electrical switch of the second solenoid driver is configured to default to the open position when a second channel of the at least one controller is unpowered, the first channel is for controlling the first solenoid driver and the second channel is for controlling the second solenoid driver.

16. The method of claim 13, wherein commanding the first solenoid driver to de-energize the first solenoid coil comprises commanding a second electrical switch of the first solenoid driver to an open position for disconnecting the first solenoid coil from a power source; and wherein commanding the second solenoid driver to de-energize the second solenoid coil comprises commanding a second electrical switch of the second solenoid driver to an open position for disconnecting the second solenoid coil from the power source.

17. The method of claim 16 wherein the second electrical switch of the first solenoid driver is configured to default to the open position when the first channel is unpowered and the second electrical switch of the second solenoid driver is configured to default to the open position when the second channel is unpowered.

18. The method of claim 16, wherein the first electrical switch and the second electrical switch of the first solenoid driver are configured to default to the open position when the first channel is unpowered and the first electrical switch and the second electrical switch of the second solenoid driver is configured to default to the open position when the second channel is unpowered.

* * * * *